US008683397B2

(12) United States Patent
Yeo et al.

(10) Patent No.: US 8,683,397 B2
(45) Date of Patent: Mar. 25, 2014

(54) METHOD AND APPARATUS OF DESIGNING SEMICONDUCTOR CHIP

(71) Applicant: Electronics and Telecommunications Research Institute, Daejeon (KR)

(72) Inventors: Soon Il Yeo, Daejeon (KR); Young Ho Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 13/674,281

(22) Filed: Nov. 12, 2012

(65) Prior Publication Data
US 2013/0191797 A1 Jul. 25, 2013

(30) Foreign Application Priority Data
Jan. 19, 2012 (KR) .................. 10-2012-0006219

(51) Int. Cl.
*G06F 17/50* (2006.01)
(52) U.S. Cl.
USPC ........... 716/102; 716/101; 716/104; 716/106; 702/58; 702/64; 702/65
(58) Field of Classification Search
USPC ............ 716/101, 102, 110, 115, 104, 106; 702/58, 64, 65
See application file for complete search history.

(56) References Cited

U.S. PATENT DOCUMENTS

| 7,222,033 | B1 * | 5/2007 | Newson et al. | 702/65 |
| 7,464,346 | B2 * | 12/2008 | Huang et al. | 716/126 |
| 2002/0019730 | A1 * | 2/2002 | Garner et al. | 703/14 |
| 2004/0044967 | A1 * | 3/2004 | Okuda et al. | 716/1 |
| 2006/0123378 | A1 * | 6/2006 | Cizl et al. | 716/18 |
| 2007/0236207 | A1 * | 10/2007 | Thomason | 324/96 |
| 2009/0158235 | A1 * | 6/2009 | Ghica | 716/18 |
| 2010/0122228 | A1 * | 5/2010 | McCracken et al. | 716/6 |
| 2011/0121865 | A1 * | 5/2011 | Olmos et al. | 327/77 |

FOREIGN PATENT DOCUMENTS

| JP | 2000-048063 A | 2/2000 |
| JP | 2006-173262 A | 6/2006 |
| KR | 10-2011-0045262 A | 5/2011 |
| KR | 10-2011-0085417 A | 7/2011 |

OTHER PUBLICATIONS

Seungduck Choi et al., "Power electromagnetic waves noise countermeasures by switching and study of circuit design improvement", Journal of Korean Institute of Information Technology, pp. 23-28, vol. 3, No. 6.

* cited by examiner

*Primary Examiner* — Vuthe Siek
*Assistant Examiner* — Brian Ngo
(74) *Attorney, Agent, or Firm* — Rabin & Berdo, P.C.

(57) ABSTRACT

Disclosed are a method and an apparatus of designing a semiconductor chip. The disclosed method includes the steps of: storing a plurality of EMS (Electro Magnetic Susceptibility) semiconductor IPs (Intellectual Property) and a plurality of EMI (Electro Magnetic Interference) semiconductor IPs; selecting a proper semiconductor IP from among the plurality of EMS shielding semiconductor IPs in a case of an input pin, and selecting a proper semiconductor IP from among the plurality of EMI shielding semiconductor IPs in a case of an output pin; and designing the semiconductor chip by disposing the selected semiconductor IP.

8 Claims, 3 Drawing Sheets

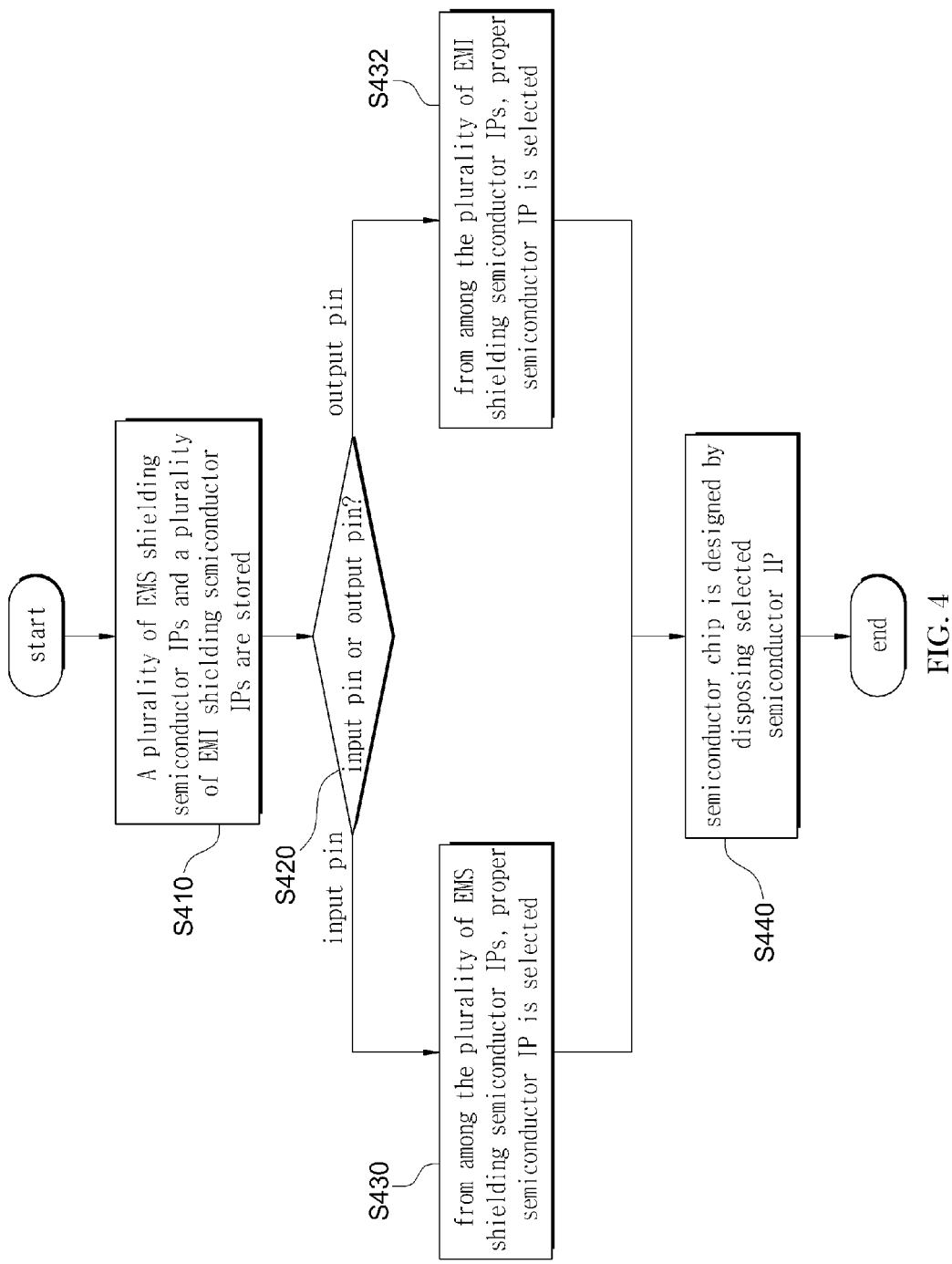

METHOD AND APPARATUS OF DESIGNING SEMICONDUCTOR CHIP

CROSS-REFERENCE TO RELATED APPLICATIONS

This application is based on and claims priority from Korean Patent Application No. 10-2012-0006219, filed on Jan. 19, 2012, with the Korean Intellectual Property Office, the disclosure of which is incorporated herein in its entirety by reference.

TECHNICAL FIELD

The present disclosure relates to a method of designing a semiconductor chip. More particularly, the present disclosure relates to a method and an apparatus of designing semiconductor chip shielding EMC.

BACKGROUND

An electromagnetic wave is known to have an influence on a human body and in some cases, to be a cause of cancer. Also, the electromagnetic wave may have an influence on a human body and also cause operation error in an electric/electronic system. This phenomenon may be referred to EMC (Electro Magnetic Compatibility).

EMC indicates a phenomenon where an electromagnetic wave causes operation error or malfunction in an electric/electronic system, which includes both EMI (Electro Magnetic Interference) and EMS (Electro Magnetic Susceptibility).

As the operation speed of a semiconductor chip recently reaches a GHz band, an influence of EMI occurring at a semiconductor chip itself cannot be disregarded now. Further, a situation has developed where it is impossible to be free from an influencing power of EMS from other semiconductor chips.

Meanwhile, for EMC, the measure has been treated at a system level, that is, at a PCB level so far. There have been few measures for operation error or malfunction in a semiconductor chip, caused by EMC at a semiconductor chip level.

SUMMARY

The present disclosure has been made in an effort to solve the above described problems, and provides a method and an apparatus of designing a semiconductor chip, in which a noise caused by EMC inevitably occurring according to an increase of an operation speed of a semiconductor chip up to a GHz band or more can be inhibited at a semiconductor chip level.

An exemplary embodiment of the present disclosure provides a method of designing a semiconductor chip, the method including the steps of: storing a plurality of EMS (Electro Magnetic Susceptibility) semiconductor IPs (Intellectual Property) and a plurality of EMI (Electro Magnetic Interference) semiconductor IPs; selecting a proper semiconductor IP from among the plurality of EMS shielding semiconductor IPs in a case of an input pin, and selecting a proper semiconductor IP from among the plurality of EMI shielding semiconductor IPs in a case of an output pin; and designing the semiconductor chip by disposing the selected semiconductor IP.

Another exemplary embodiment of the present disclosure provides an apparatus of designing a semiconductor chip, including: an EMS shielding semiconductor IP storage unit for storing a plurality of EMS shielding semiconductor IPs; an EMI shielding semiconductor IP storage unit for storing a plurality of EMI shielding semiconductor IPs; an input/output pin determining unit for outputting a control signal for determining an input pin or an output pin; a proper semiconductor IP selecting unit for outputting a control signal for selecting a proper semiconductor IP from among the plurality of EMS shielding semiconductor IPs or the plurality of EMI shielding semiconductor IPs; a control signal input unit for selecting the proper semiconductor IP from among the plurality of EMS shielding semiconductor IPs in a case of the input pin, and selecting the proper semiconductor IP from among the plurality of EMI shielding semiconductor IPs in a case of the output pin according to the control signal of the input/output pin determining unit and the control signal of the proper semiconductor IP selecting unit; a selected semiconductor IP output unit for outputting the semiconductor IP selected by the control signal input unit; and a semiconductor chip designing unit for designing the semiconductor chip by disposing the semiconductor IP output from the selected semiconductor IP output unit.

As described above, in the method and the apparatus of designing an EMC shielding semiconductor chip, according to the present disclosure, a noise caused by EMC inevitably occurring according to an increase of an operation speed of a semiconductor chip up to the GHz band or more can be effectively inhibited at a semiconductor chip level. Accordingly, it is possible to satisfy EMC measurement standards at a semiconductor chip level, such as a TEM Cell method, a DPI (Direct Power Injection) method and a BCI (Bulk Current Injection) method, suggested by IEC (International Electrotechnical Commission).

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a flow chart illustrating a method of designing a semiconductor chip, according to one embodiment of the present disclosure.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

In general, in view of a semiconductor chip, it can be seen that an influence of EMS (Electro Magnetic Susceptibility) is emitted from an input pin, and EMI (Electro Magnetic Interference) is emitted through an output pin to the outside of the semiconductor chip. Accordingly, in order to design a semiconductor chip shielding EMC (Electro Magnetic Compatibility), it can be considered that a circuit shielding against EMS is disposed at the side of the input pin, and a circuit shielding against EMI is disposed at the side of the output pin.

In the present disclosure, both an EMS shielding circuit and an EMI shielding circuit are prepared, and efficiently disposed. Herein, both the EMS shielding circuit and the EMI shielding circuit have to be prepared in forms of semiconductor IPs (Intellectual Property). Since the semiconductor IPs exist in various forms for each of EMS, and EMI, and all of the circuits have to be prepared in the forms of semiconductor IPs. In other words, a circuit for inhibiting EMC may be configured as an EMC shielding circuit, that is, a semiconductor IP, through a combination of a capacitor, an inductor and resistances. Thus, it may be configured through various circuit combinations. In the present disclosure, all of these circuits are prepared in the forms of semiconductor IPs, and then, in the disposition step in the design, simulation is performed so as to select an optimum semiconductor IP.

Also, the semiconductor chip is configured in such a manner that it can operate by interlocking a system. However, it is very difficult to design the semiconductor chip by completely grasping the EMC situation in the system. Therefore, at an input/output pin of the semiconductor chip, a semiconductor IP having an optimum EMC defending characteristic has to be disposed. Accordingly, in the present disclosure, at the input/output pin, an EMC shielding semiconductor IP is disposed. Herein, from among various semiconductor IPs, an optimum semiconductor IP has to be disposed.

Hereinafter, exemplary embodiments of the present disclosure will be described in detail with reference to the accompanying drawings. In a description of the present disclosure, a detailed description of related known configurations and functions will be omitted when it may make the essence of the present disclosure obscure.

Figure 1:
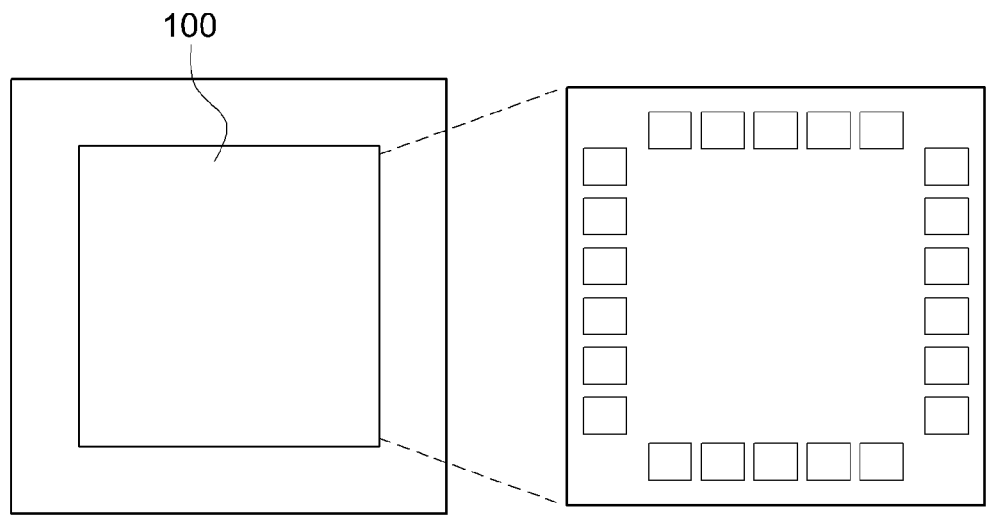
FIG. 1 is a conceptual view illustrating a method of designing a semiconductor chip, according to one embodiment of the present disclosure.

FIG. 1 is a conceptual view illustrating a method of designing a semiconductor chip, according to one embodiment of the present disclosure.

As shown in FIG. 1, the design of an EMC shielding semiconductor chip also may be additionally carried out in a design using a general CAD (Computer Aided Design) tool 100. In other words, after a general design is performed in the CAD tool 100, EMC-related design elements are applied so as to design the EMC shielding semiconductor chip.

Figure 2:
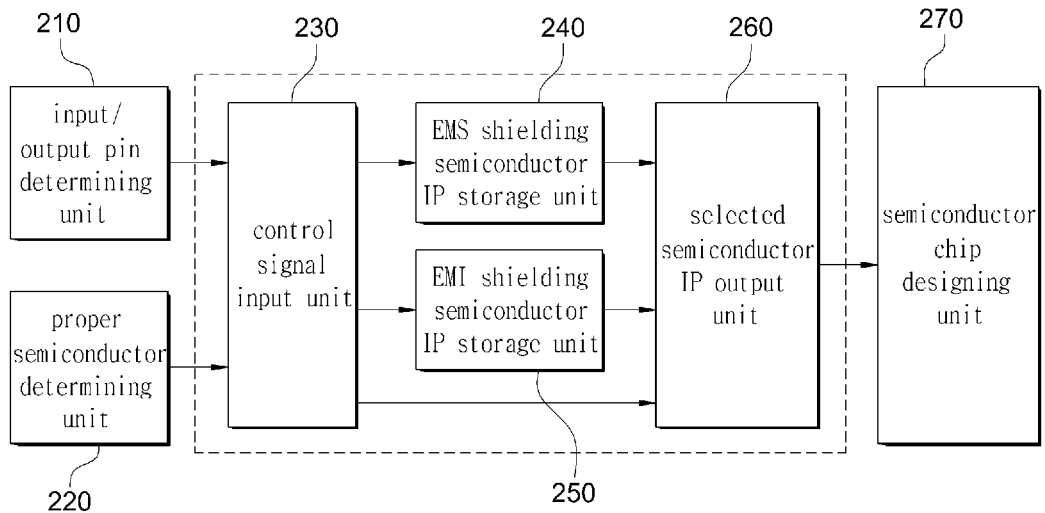
FIG. 2 is a view illustrating the configuration of an apparatus of designing a semiconductor chip, according to one embodiment of the present disclosure.

FIG. 2 is a view illustrating the configuration of an apparatus of designing a semiconductor chip, according to one embodiment of the present disclosure.

Referring to FIG. 2, the inventive apparatus of designing the semiconductor chip includes an input/output pin determining unit 210, a proper semiconductor IP selecting unit 220, a control signal input unit 230, an EMS shielding semiconductor IP storage unit 240, an EMI shielding semiconductor IP storage unit 250, a selected semiconductor IP output unit 260 and a semiconductor chip designing unit 270.

The input/output pin determining unit 210 outputs a control signal for determining an input pin or an output pin. Herein, the input/output pin determining unit 210 determines the input pin or the output pin according to information input to a corresponding CAD tool.

The proper semiconductor IP selecting unit 220, based on an EMC simulation result of the whole semiconductor chip, outputs a control signal for selecting a proper semiconductor IP from among a plurality of EMS shielding semiconductor IPs stored in the EMS shielding semiconductor IP storage unit 240 or a plurality of EMI shielding semiconductor IPs stored in the EMI shielding semiconductor IP storage unit 250. Herein, the proper semiconductor IP selecting unit 220 selects the proper semiconductor IP by selecting a serial number stored in the EMS shielding semiconductor IP storage unit 240 and the EMI shielding semiconductor IP storage unit 240.

The proper semiconductor IP selecting unit 220 selects a semiconductor IP in a form corresponding to each design step of the semiconductor chip when selecting the proper semiconductor IP from among the plurality of EMS shielding semiconductor IPs or the plurality of EMI shielding semiconductor IPs. Specifically, the design of the semiconductor chip includes an algorithm designing step, an HDL (Hardware Description Language) designing step, an HDL synthesizing step, a net-list disposing step, a net-list synthesizing step and a P&R (Placement and Routing) step. The proper semiconductor IP selecting unit 220 according to the present disclosure selects a semiconductor IP corresponding to each design step of the semiconductor chip, such as the algorithm designing step, the HDL designing step, the HDL synthesizing step, the net-list disposing step, the net-list synthesizing step and the P&R step.

According to the control signals of the input/output pin determining unit 210 and the proper semiconductor IP selecting unit 220, the control signal input unit 230 selects the proper semiconductor IP from among the plurality of EMS shielding semiconductor IPs in the case of an input pin, and selects the proper semiconductor IP from among the plurality of EMI shielding semiconductor IPs in the case of an output pin.

The EMS shielding semiconductor IP storage unit 240 stores the plurality of EMS shielding semiconductor IPs. Herein, the EMS shielding semiconductor IP storage unit 240 stores a semiconductor IP in a form corresponding to each design step of the semiconductor chip, as each of the EMS shielding semiconductor IPs. For this, specific configuration of the EMS shielding semiconductor IP storage unit 240 will be described with reference to FIG. 3.

The EMI shielding semiconductor IP storage unit 250 stores the plurality of EMI shielding semiconductor IPs. Herein, like the EMS shielding semiconductor IP storage unit 240, the EMI shielding semiconductor IP storage unit 250 stores a semiconductor IP in a form corresponding to each design step of the semiconductor chip, as each of the EMI shielding semiconductor IPs.

The selected semiconductor IP output unit 260 outputs the semiconductor IP selected by the control signal input unit 230.

The semiconductor chip designing unit 270 designs the semiconductor chip by disposing the semiconductor IP output from the selected semiconductor IP output unit 260.

Figure 3:
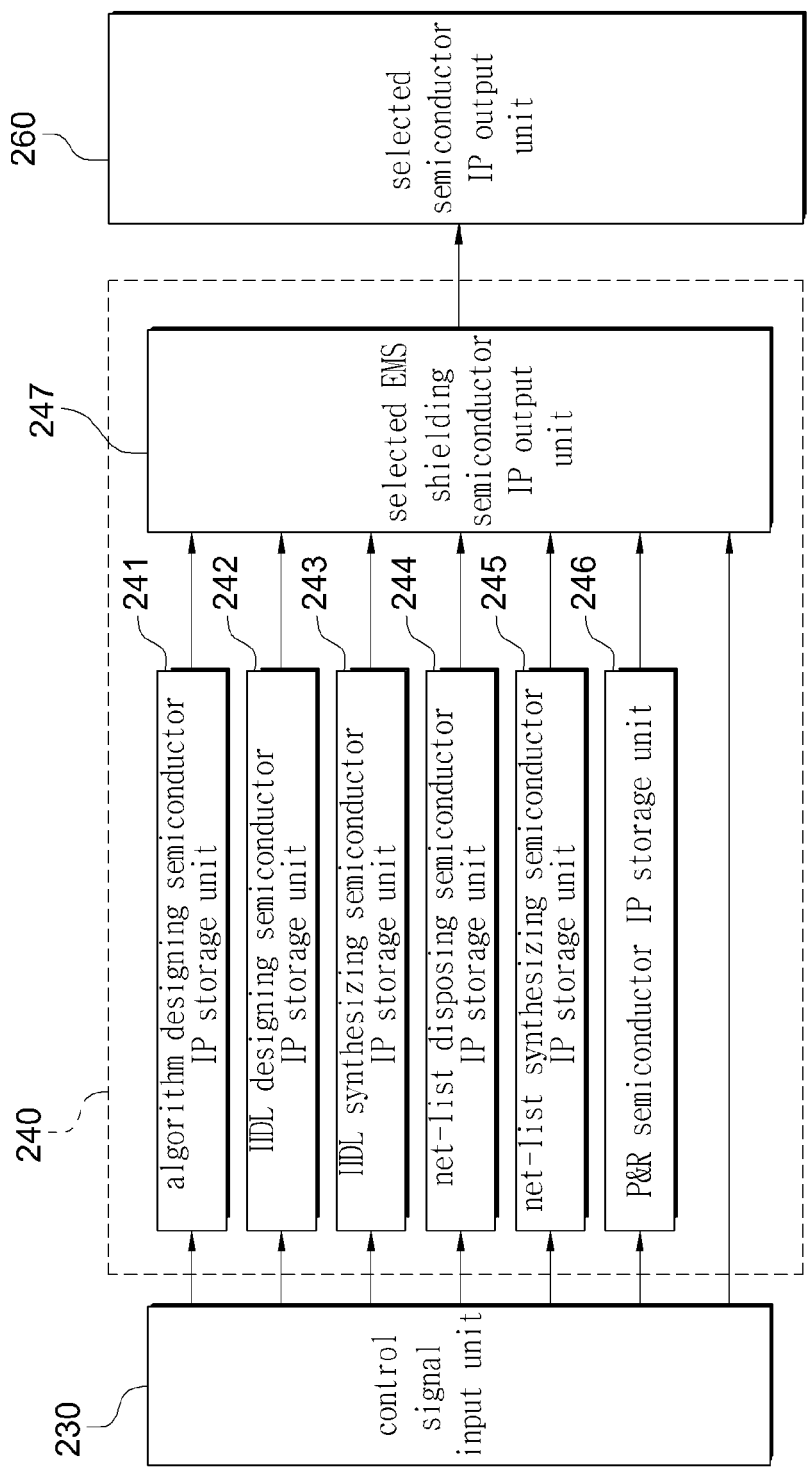
FIG. 3 is a view illustrating the configuration of an EMS shielding semiconductor IP storage unit according to one embodiment of the present disclosure.

FIG. 3 is a view illustrating the configuration of an EMS shielding semiconductor IP storage unit according to one embodiment of the present disclosure.

Referring to FIG. 3, the inventive EMS shielding semiconductor IP storage unit 240 includes, correspondingly to respective design steps of the semiconductor chip, an algorithm designing semiconductor IP storage unit 241, an HDL designing semiconductor IP storage unit 242, an HDL synthesizing semiconductor IP storage unit 243, a net-list disposing semiconductor IP storage unit 244, a net-list synthesizing semiconductor IP storage unit 245, a P&R semiconductor IP storage unit 246 and a selected EMS shielding semiconductor IP output unit 247.

The algorithm designing semiconductor IP storage unit 241 stores each of the EMS shielding semiconductor IPs in the form of an algorithm designing semiconductor IP.

The HDL designing semiconductor IP storage unit 242 stores each of the EMS shielding semiconductor IPs in the form of an HDL designing semiconductor IP.

The HDL synthesizing semiconductor IP storage unit 243 stores each of the EMS shielding semiconductor IPs in the form of an HDL synthesizing semiconductor IP.

The net-list disposing semiconductor IP storage unit 244 stores each of the EMS shielding semiconductor IPs in the form of a net-list disposing semiconductor IP.

The net-list synthesizing semiconductor IP storage unit 245 stores each of the EMS shielding semiconductor IPs in the form of a net-list synthesizing semiconductor IP.

The P&R semiconductor IP storage unit 246 stores each of the EMS shielding semiconductor IPs in the form of a P&R semiconductor IP.

The selected EMS shielding semiconductor IP output unit 247 outputs the semiconductor IP selected by the control signal input unit 230 which corresponds to each design step of the semiconductor chip.

Meanwhile, the inventive EMI shielding semiconductor IP storage unit 250 has the same elements as those of the EMS shielding semiconductor IP storage unit 240, and its specific description will be omitted.

FIG. 4 is a flow chart illustrating a method of designing a semiconductor chip, according to one embodiment of the present disclosure.

Referring to FIG. 4, the plurality of EMS shielding semiconductor IPs and the plurality of EMI shielding semiconductor IPs are stored in step S410. Herein, the EMS shielding semiconductor IPs and the EMI shielding semiconductor IPs are respectively stored in the forms of the algorithm designing semiconductor IP, the HDL designing semiconductor IP, the HDL synthesizing semiconductor IP, the net-list disposing semiconductor IP, the net-list synthesizing semiconductor IP and the P&R semiconductor IP, correspondingly to respective design steps of the semiconductor chip.

Then, the input pin or the output pin is determined in step S420.

Based on an EMC simulation result of the whole semiconductor chip, in the case of the input pin, the proper semiconductor IP from among the plurality of EMS shielding semiconductor IPs is selected in step S430, and in the case of the output pin, the proper semiconductor IP from among the plurality of EMI shielding semiconductor IPs is selected in step S432. Herein, a semiconductor IP in a form corresponding to each design step of the semiconductor chip is selected.

Lastly, the semiconductor chip is designed by disposing the selected semiconductor IP in step S440. Herein, the semiconductor chip is designed through general semiconductor chip design steps such as the algorithm designing step, the HDL designing step, the HDL synthesizing step, the net-list disposing step, the net-list synthesizing step and the P&R step.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of designing a semiconductor chip, the method comprising the steps of:

preparing a plurality of EMS (Electro Magnetic Susceptibility) shielding circuits for inhibiting EMS emitted from an input in of the semiconductor chip, in a form of a plurality of EMS semiconductor IPs (Intellectual Property), preparing a plurality of EMI (Electro Magnetic Interference) shielding circuits for inhibiting EMI emitted through an output in of the semiconductor chip, in a form of a plurality of EMI semiconductor IPs, and storing the prepared plurality of EMS and EMI semiconductor IPs; performing an EMC (Electro Magnetic Compatibility) simulation of the whole semiconductor IP and outputting results by a plurality of control signals, wherein the EMC simulation includes both EMI simulation and EMS simulation;

selecting, using a computing device, a proper semiconductor IP from among the plurality of EMS shielding semiconductor IPs for the input pin based on a EMS simulation result indicated by the control signals, and selecting, using the computing device, a proper semiconductor IP from among the plurality of EMI shielding semiconductor IPs for the output pin based on a EMI simulation result indicated by the control signals; and designing, using the computing device, the semiconductor chip by disposing the selected semiconductor IPs.

2. The method of claim 1, wherein in the step of storing the prepared plurality of EMS and EMI semiconductor IPs, the EMS shielding semiconductor IPs and the EMI shielding semiconductor IPs are respectively stored in forms of an algorithm designing semiconductor IP, an HDL (Hardware Description Language) designing semiconductor IP, an HDL synthesizing semiconductor IP, a net-list disposing semiconductor IP, a net-list synthesizing semiconductor IP and a P&R (Placement and Routing) semiconductor IP.

3. The method of claim 1, wherein in each step of selecting the proper semiconductor IP, one of the EMS or EMI semiconductor IPs in a form corresponding to each design step of the semiconductor chip is selected.

4. An apparatus of designing a semiconductor chip, comprising:

an EMS (Electro Magnetic Susceptibility) shielding semiconductor IP (Intellectual Property) storage unit for storing a plurality of EMS shielding semiconductor IPs;

an EMI (Electro Magnetic Interference) shielding semiconductor IP storage unit for storing a plurality of EMI shielding semiconductor IPs;

an input/output pin determining unit for outputting a control signal for determining an input pin or an output pin;

a proper semiconductor IP selecting unit for outputting a control signal for selecting a proper semiconductor IP from among the plurality of EMS shielding semiconductor IPs or the plurality of EMI shielding semiconductor IPs;

a control signal input unit for selecting the proper semiconductor IP from among the plurality of EMS shielding semiconductor IPs in a case of the input pin, and selecting the proper semiconductor IP from among the plurality of EMI shielding semiconductor IPs in a case of the output pin according to the control signal of the input/output pin determining unit and the control signal of the proper semiconductor IP selecting unit;

a selected semiconductor IP output unit for outputting the semiconductor IP selected by the control signal input unit; and a semiconductor chip designing unit for designing the semiconductor chip by disposing the semiconductor IP output from the selected semiconductor IP output unit.

5. The apparatus of claim 4, wherein each of the EMS shielding semiconductor IPs indicates a semiconductor IP of an EMS shielding circuit, and each of the EMI shielding semiconductor IPs indicates a semiconductor IP of an EMI shielding circuit.

6. The apparatus of claim 4, wherein the EMS shielding semiconductor IP storage unit comprises:
- an algorithm designing semiconductor IP storage unit for storing each of the EMS shielding semiconductor IPs in a form of an algorithm designing semiconductor IP;
- an HDL designing semiconductor IP storage unit for storing each of the EMS shielding semiconductor IPs in a form of an HDL designing semiconductor IP;
- an HDL synthesizing semiconductor IP storage unit for storing each of the EMS shielding semiconductor IPs in a form of an HDL synthesizing semiconductor IP;
- a net-list disposing semiconductor IP storage unit for storing each of the EMS shielding semiconductor IPs in a form of a net-list disposing semiconductor IP;
- a net-list synthesizing semiconductor IP storage unit for storing each of the EMS shielding semiconductor IPs in a form of a net-list synthesizing semiconductor IP;
- a P&R semiconductor IP storage unit for storing each of the EMS shielding semiconductor IPs in a form of a P&R semiconductor IP; and
- a selected EMS shielding semiconductor IP output unit for outputting the semiconductor IP selected by the control signal input unit, which corresponds to each design step of the semiconductor chip.

7. The apparatus of claim 4, wherein the EMI shielding semiconductor IP storage unit comprises:
- an algorithm designing semiconductor IP storage unit for storing each of the EMI shielding semiconductor IPs in a form of an algorithm designing semiconductor IP;
- an HDL designing semiconductor IP storage unit for storing each of the EMI shielding semiconductor IPs in a form of an HDL designing semiconductor IP;
- an HDL synthesizing semiconductor IP storage unit for storing each of the EMI shielding semiconductor IPs in a form of an HDL synthesizing semiconductor IP;
- a net-list disposing semiconductor IP storage unit for storing each of the EMI shielding semiconductor IPs in a form of a net-list disposing semiconductor IP;
- a net-list synthesizing semiconductor IP storage unit for storing each of the EMI shielding semiconductor IPs in a form of a net-list synthesizing semiconductor IP;
- a P&R semiconductor IP storage unit for storing each of the EMI shielding semiconductor IPs in a form of a P&R semiconductor IP; and
- a selected EMI shielding semiconductor IP output unit for outputting the semiconductor IP selected by the control signal input unit, which corresponds to each design step of the semiconductor chip.

8. The apparatus of claim 4, wherein the proper semiconductor IP selecting unit selects the semiconductor IP in a form corresponding to each design step of the semiconductor chip.

* * * * *